US011012400B1

(12) United States Patent
Xu et al.

(10) Patent No.: US 11,012,400 B1
(45) Date of Patent: May 18, 2021

(54) TRIGGERING EVENT NOTIFICATIONS BASED ON MESSAGES TO APPLICATION USERS

(71) Applicant: Citrix Systems, Inc., Fort Lauderdale, FL (US)

(72) Inventors: Sai Xu, Nanjing (CN); Taodong Lu, Nanjing (CN); Qin Zhang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/857,571

(22) Filed: Apr. 24, 2020

Related U.S. Application Data

(63) Continuation of application No. PCT/CN2020/084670, filed on Apr. 14, 2020.

(51) Int. Cl.
| | | |
|---|---|---|
| *G06F 15/16* | (2006.01) | |
| *G06F 9/54* | (2006.01) | |
| *H04L 29/06* | (2006.01) | |
| *H04L 12/58* | (2006.01) | |
| *G06F 3/0482* | (2013.01) | |
| *G06Q 10/10* | (2012.01) | |

(52) U.S. Cl.
CPC ............ *H04L 51/24* (2013.01); *G06F 3/0482* (2013.01); *G06F 9/542* (2013.01); *G06Q 10/107* (2013.01); *H04L 51/046* (2013.01); *H04L 51/22* (2013.01)

(58) Field of Classification Search
CPC ...................................................... H04L 51/24
USPC ....................................................... 709/206
See application file for complete search history.

(56) References Cited

U.S. PATENT DOCUMENTS

| | | | | |
|---|---|---|---|---|
| 2007/0173992 A1* | 7/2007 | McCutchen | ........... | G06Q 10/00 701/31.4 |
| 2007/0179798 A1* | 8/2007 | Inbarajan | ............... | G06Q 10/00 701/31.4 |
| 2008/0021605 A1* | 1/2008 | Huber | .................... | G07C 5/008 701/31.4 |
| 2008/0027604 A1* | 1/2008 | Oesterling | ............. | G07C 5/085 701/29.5 |
| 2009/0182872 A1* | 7/2009 | Hong | ...................... | H04L 67/38 709/224 |
| 2010/0100778 A1* | 4/2010 | Sullivan | .................. | H04L 67/00 714/57 |

(Continued)

FOREIGN PATENT DOCUMENTS

| | | |
|---|---|---|
| CN | 103348663 A | 10/2013 |
| CN | 103718578 A | 4/2014 |
| WO | WO-2007079417 A2 * | 7/2007 ......... G06Q 30/0278 |

OTHER PUBLICATIONS

International Search Report and Written Opinion dated Jan. 13, 2021 for International Patent Application No. PCT/CN2020/084670.

*Primary Examiner* — Hamza N Algibhah
(74) *Attorney, Agent, or Firm* — Pierce Atwood LLP

(57) ABSTRACT

In accordance with one disclosed method, a first computing system may receive a message from an application hosted on a second computing system, the message being indicative of an event of the application. In response to receiving the message, the first computing system may generate a notification indicative of the event and send the generated notification to a client device. The first computing system may receive a response to the notification from the client device, and may process the response so as to cause the application to take an action responsive to the event.

20 Claims, 11 Drawing Sheets

(56) References Cited

U.S. PATENT DOCUMENTS

| | | | |
|---|---|---|---|
| 2011/0022662 A1* | 1/2011 | Barber-Mingo | G06Q 10/06 709/206 |
| 2011/0040863 A1* | 2/2011 | Griffin | H04L 67/1095 709/223 |
| 2011/0041140 A1* | 2/2011 | Harm | G06F 9/541 719/318 |
| 2011/0106892 A1* | 5/2011 | Nelson | G06Q 10/109 709/206 |
| 2012/0303774 A1 | 11/2012 | Wilson et al. | |
| 2014/0012997 A1 | 1/2014 | Erbe | |
| 2014/0052797 A1* | 2/2014 | Lessard | G06Q 10/109 709/206 |
| 2014/0136609 A1* | 5/2014 | Churchill | H04L 51/046 709/203 |
| 2016/0050194 A1* | 2/2016 | Rachmiel | G06F 21/552 726/4 |
| 2016/0105814 A1* | 4/2016 | Hurst | H04L 67/18 370/252 |
| 2017/0116014 A1* | 4/2017 | Yang | G06F 11/079 |
| 2017/0154086 A1* | 6/2017 | Meier-Magruder | G06F 11/3068 |
| 2017/0318072 A1* | 11/2017 | Borrowman | H04L 67/02 |
| 2018/0091456 A1 | 3/2018 | Weinberg et al. | |
| 2018/0114242 A1* | 4/2018 | Lopez | G06Q 30/0224 |
| 2019/0041973 A1* | 2/2019 | Maheshwari | G10L 19/018 |
| 2019/0140995 A1* | 5/2019 | Roller | G06F 40/295 |
| 2019/0208412 A1* | 7/2019 | Lord | H04L 67/22 |
| 2019/0260804 A1* | 8/2019 | Beck | G06N 20/10 |
| 2019/0297034 A1* | 9/2019 | Gupta | H04L 51/04 |
| 2020/0336514 A1* | 10/2020 | Momchilov | H04L 67/42 |

\* cited by examiner

TRIGGERING EVENT NOTIFICATIONS BASED ON MESSAGES TO APPLICATION USERS

CROSS-REFERENCE TO RELATED APPLICATIONS

This application is a continuation of and claims the benefit under 35 U.S.C. § 120 and 35 U.S.C. § 365(c) to International Application PCT/CN2020/084670, entitled TRIGGERING EVENT NOTIFICATIONS BASED ON MESSAGES TO APPLICATION USERS, with an international filing date of Apr. 14, 2020, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities. One feature of the Citrix Workspace™ is an intelligent activity feed for a user's many applications. Such an activity feed provides a streamlined mechanism for notifying a user of various application events in need of attention and allowing the user to efficiently act on such events, without requiring the user to switch context and separately launch the respective applications to take actions with respect to the different events.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves receiving, by a first computing system, a message from an application hosted on a second computing system, the message being indicative of an event of the application; generating, by the first computing system and in response to receiving the message, a notification indicative of the event; sending, by the first computing system, the notification to a client device; receiving, by the first computing system and from the client device, a response to the notification; and processing, by the first computing system, the received response to the notification to cause the application to take an action responsive to the event.

In some disclosed embodiments, a method involves receiving, by a first computing system, a message from an application hosted on a second computing system, the message being indicative of an event of the application; in response to receiving the message, sending, by the first computing system, a request to the application for data relating to the event; receiving, by the first computing system, the data relating to the event from the application; generating, by the first computing system and based at least in part on the received data, a notification indicative of the event; and sending, by the first computing system, the notification to a client device.

In some disclosed embodiments, a first computing system comprises at least one processor, and at least one computer-readable medium encoded with instruction which, when executed by the at least one processor, cause the first computing system to receive a message from an application hosted on a second computing system, the message being indicative of an event of the application, to generate, in response to receiving the message, a notification indicative of the event, to send the notification to a client device, to receive, from the client device, a response to the notification, and to process the received response to the notification to cause the application to take an action responsive to the event.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Figure 1A:
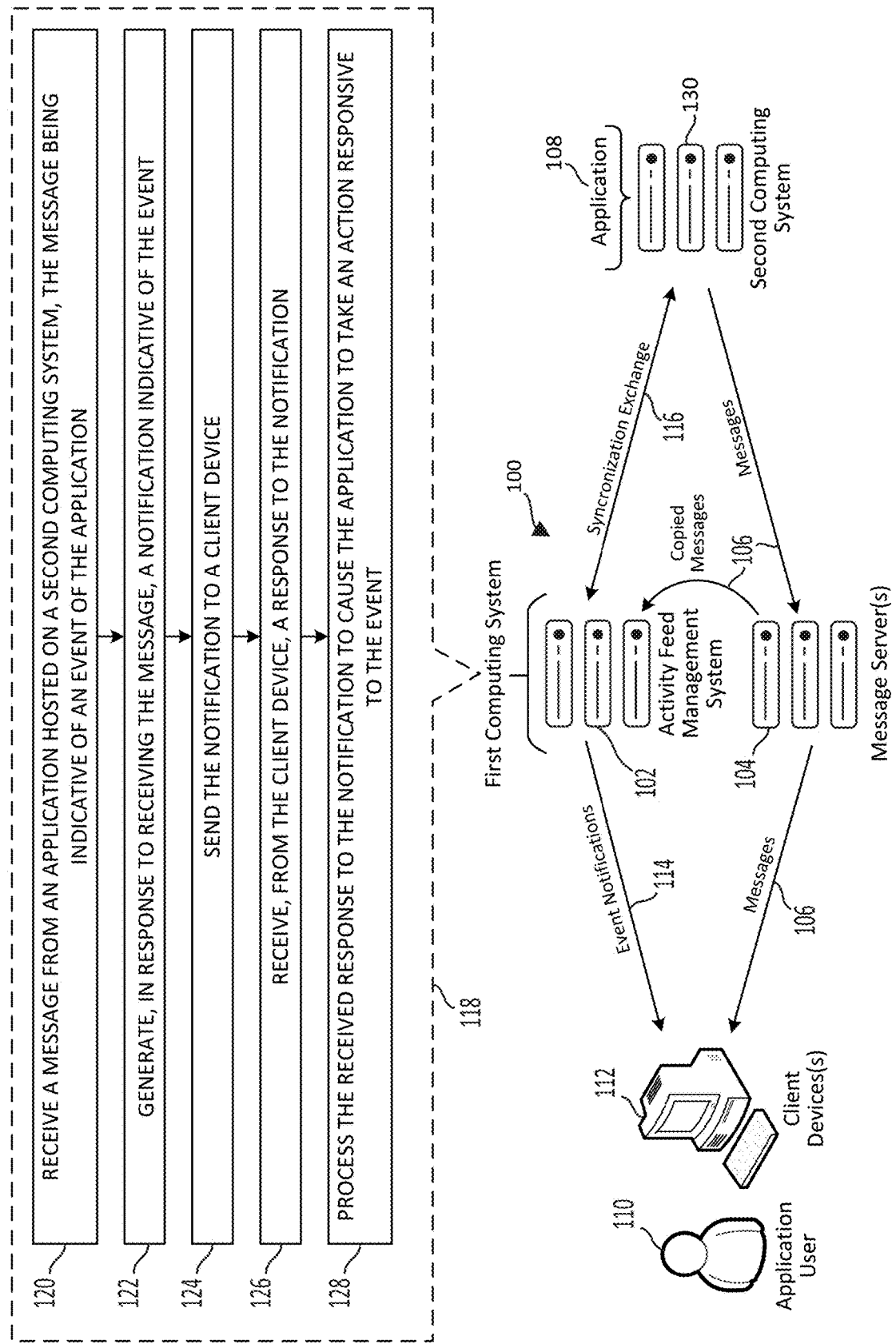
FIG. 1A is a high-level conceptual diagram showing a first example implementation of a system for triggering event notifications based on messages sent to application users in accordance with some embodiments of the present disclosure.

For purposes of reading the description of the various embodiments below, the following descriptions of the sections of the specification and their respective contents may be helpful:

Section A provides an introduction to example embodiments of systems and methods for triggering event notifications based on messages sent to application users;

Section B describes a network environment which may be useful for practicing embodiments described herein;

Section C describes a computing system which may be useful for practicing embodiments described herein;

Section D describes embodiments of systems and methods for delivering shared resources using a cloud computing environment;

Section E describes embodiments of systems and methods for managing and streamlining access by clients to a variety of resources;

Section F provides a more detailed description of the example systems and methods that were introduced above in Section A; and Section G describes example implementations of methods, systems/devices, and computer-readable media in accordance with the present disclosure.

A. Introduction to Illustrative Embodiments of Systems and Methods for Triggering Event Notifications Based on Messages Sent to Application Users An intelligent activity feed, such as that offered by the Citrix Workspace™ family of products, provides significant benefits, as it allows a user to respond to application-specific events generated by disparate systems of record, without requiring the user to switch context and separately launch the respective applications to take actions with respect to the different events. An example of a system capable of providing such an activity feed is described in Section E below in connection with FIGS. 5A-D. In such a system, a remote computing system may be responsible for monitoring and interacting with various systems of record (e.g., SaaS applications, web applications, Windows applications, Linux applications, desktops, file repositories and/or file sharing systems, etc.) on behalf of a user operating a client device. As Section E describes (in connection with FIGS. 5C and 5D), a user 524 may operate a client device 202 so as to interact with "microapps" corresponding to particular functionalities of a variety of systems of record 526, and such microapps may, in turn, interact with the systems of record 526, e.g., via application programming interfaces (APIs) of such systems, on behalf of the user 524.

More specifically, and as described in more detail in Section E, a microapp service 528 (shown in FIG. 5C) may periodically request a sync with a data integration provider service 530, so as to cause active data to be pulled from the systems of record 526. In some implementations, for example, the microapp service 528 may retrieve encrypted service account credentials for the systems of record 526 from a credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to an analytics service 536 for processing. The analytics service 536 may create notifications (e.g., targeted scored notifications) and send such notifications to the notification service 538. The notification service 538 may store the notifications in a database to be later served in an activity feed and/or may send the notifications out immediately to the client 202 as a push notification to the user 524.

Figure 5A:
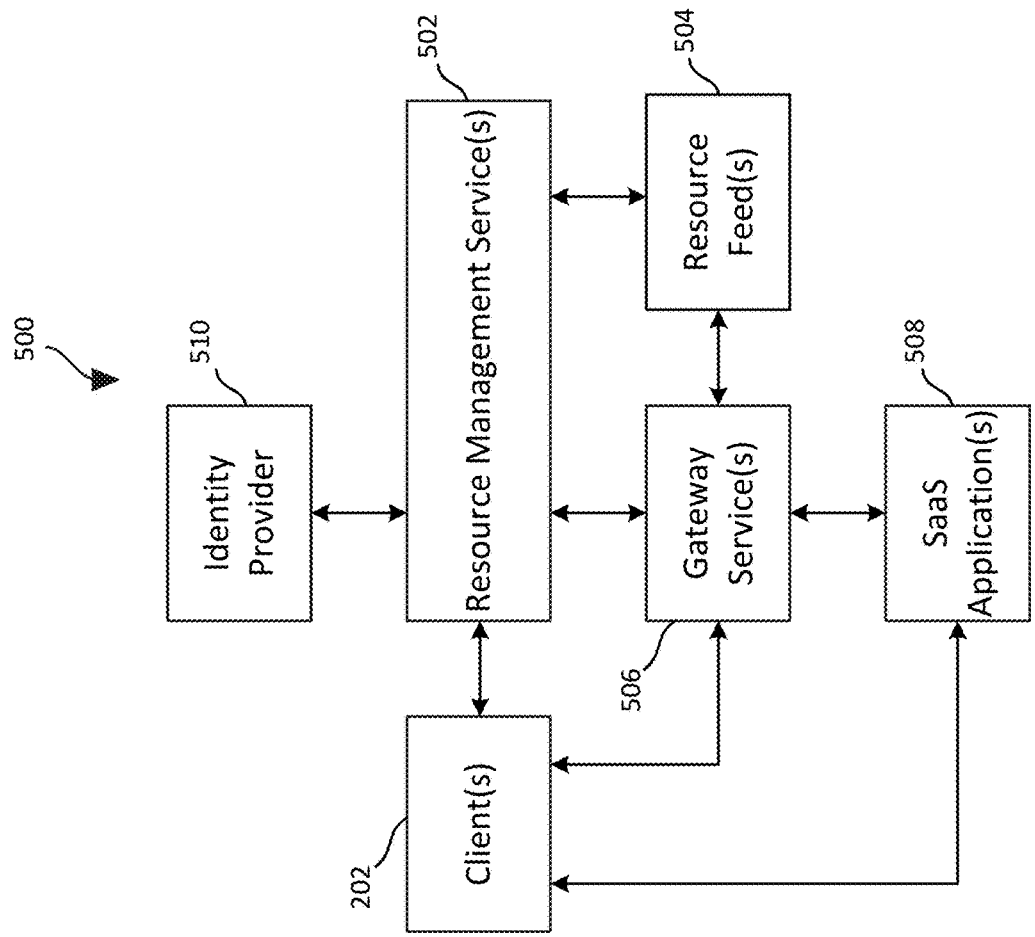
FIG. 5A is a block diagram of an example system in which resource management services may manage and streamline access by clients to resource feeds (via one or more gateway services) and/or software-as-a-service (SaaS) applications.
Figure 5B:
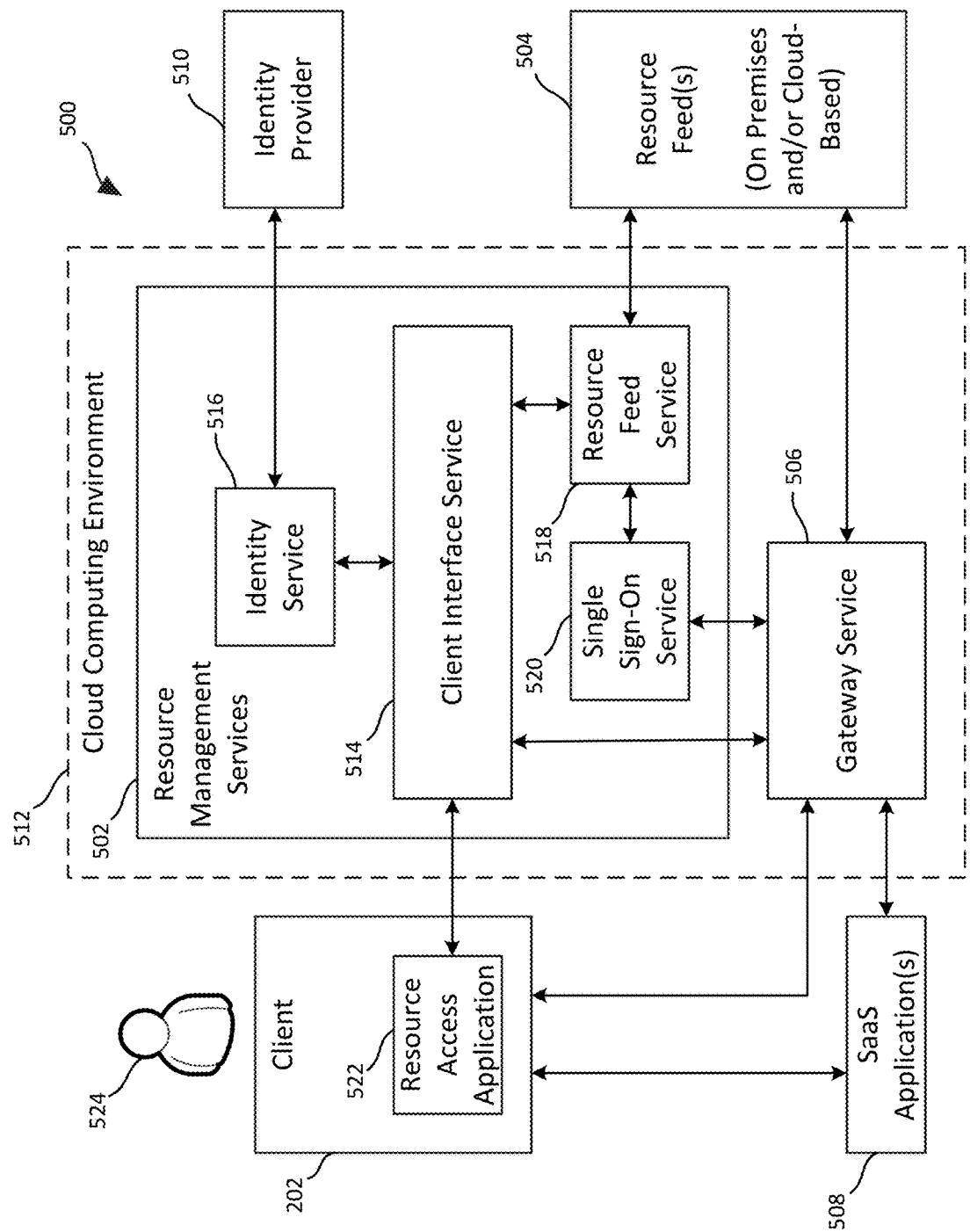
FIG. 5B is a block diagram showing an example implementation of the system shown in FIG. 5A in which various resource management services as well as a gateway service are located within a cloud computing environment.
Figure 5C:
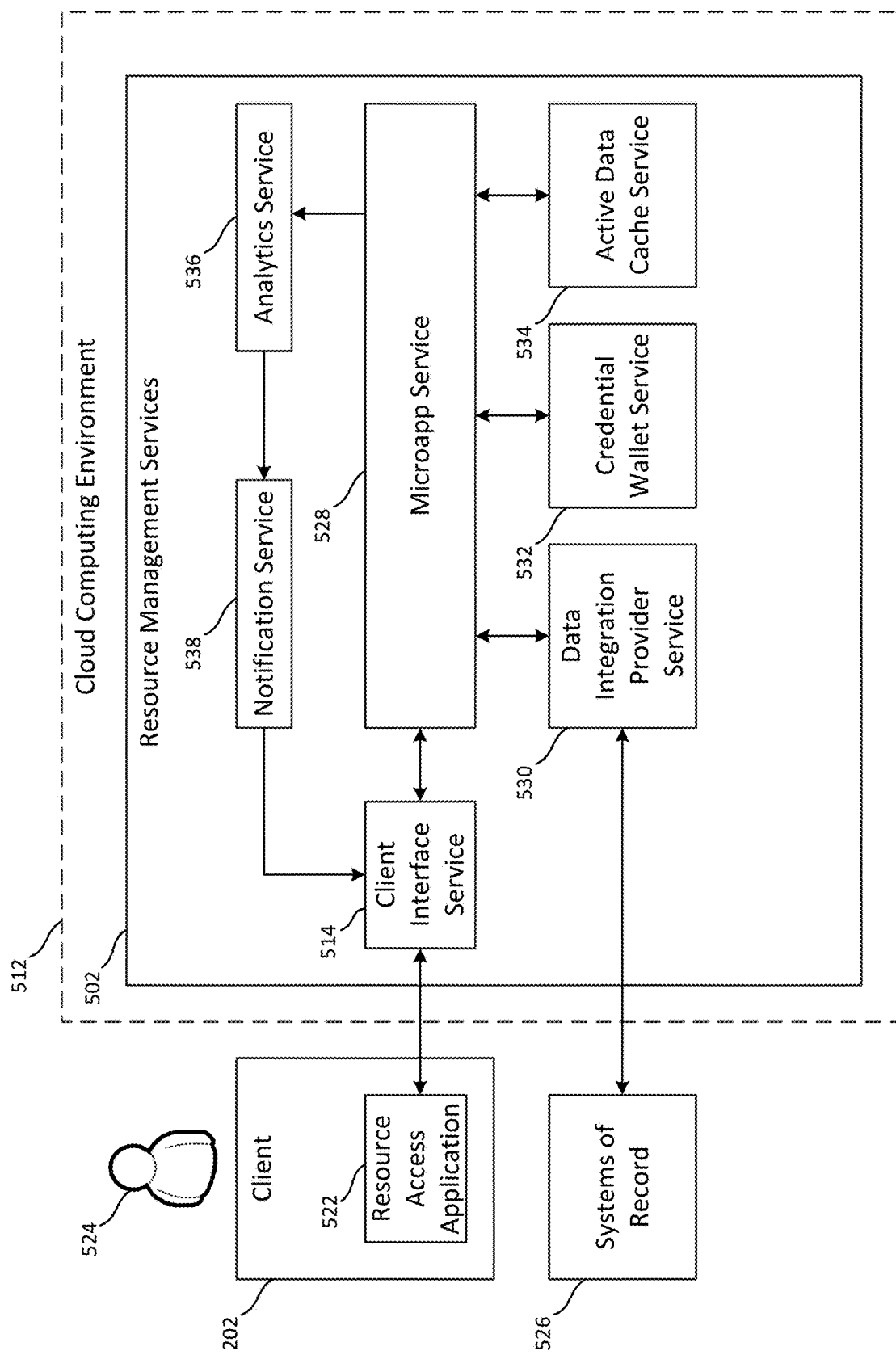
FIG. 5C is a block diagram similar to that shown in FIG. 5B but in which the available resources are represented by a single box labeled "systems of record," and further in which several different services are included among the resource management services.
Figure 5D:
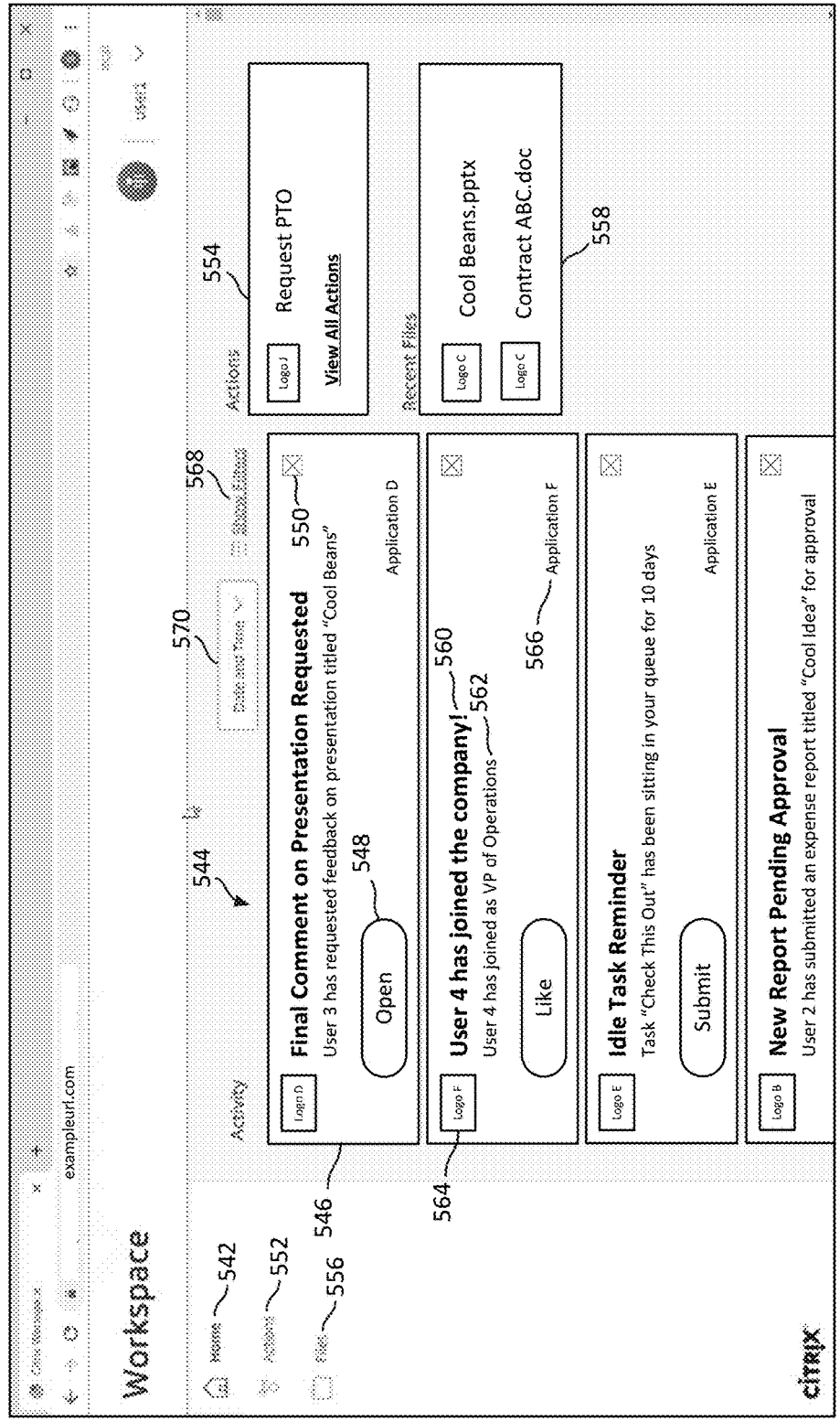
FIG. 5D shows how a display screen may appear when an intelligent activity feed feature of a multi-resource management system, such as that shown in FIG. 5C, is employed.

FIG. 5D, which is also described in more detail in Section E, shows how a display screen 540 presented by a resource access application 522 (shown in FIG. 5C) may appear when an intelligent activity feed feature is employed and a user 524 is logged on to the system. As shown in FIG. 5D, an activity feed 544 may be presented on the display screen 540 that includes a plurality of notifications 546 about respective events that occurred within various applications to which the user 524 has access rights.

Although the above-described process for acquiring data from systems of record 526 performs quite well in most situations, the inventors have recognized and appreciated that, with respect to at least some types of systems of record 526, e.g., SaaS applications, circumstances can arise in which the periodic syncing of data with such systems can result in an appreciable delay between when an event actually occurs within the system of record 526 and when a notification 546 concerning that event is presented in a user's activity feed 544. For example, if a user's data is synchronized with a system of record 526 only once every "N" minutes, data concerning at least some events that occur in that system of record 526 between such synchronization times may not be received from the system of record 526 for nearly "N" minutes. That delay, together with the time taken to process the received data and generate a notification 546, can result in a poor user experience in at least some circumstances.

Offered are systems and methods for causing notifications 546 to be generated based on when events actually occur within the systems of record, rather than relying solely on a periodic synchronization schedule. In particular, in some implementations, messages (e.g., email messages, text messages, etc.) that certain systems of record send to users to notify them about events relating to their accounts may be used as triggers for generating notifications 546. In some implementations, for example, such messages may be used as triggers for requesting syncs, e.g., via the data integration provider service 530 (shown in FIG. 5C), with the systems of record to which such messages relate. Such an approach can be particularly advantageous for certain systems of record, e.g., SaaS applications, that send email messages to users to alert them about account activity.

Figure 1B:
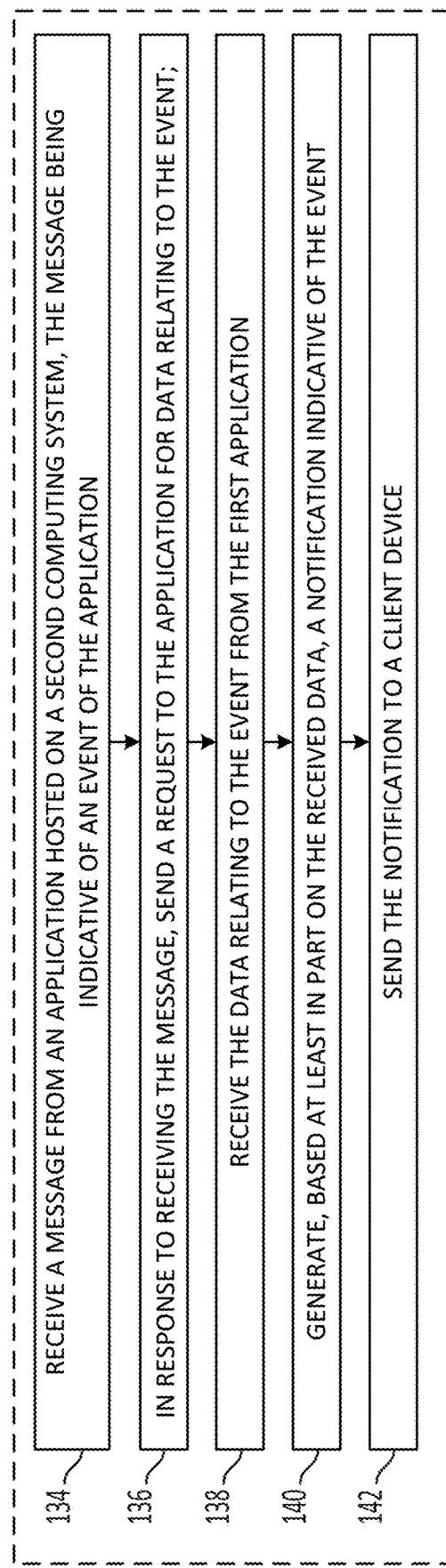
FIG. 1B is a high-level conceptual diagram showing a second example implementation of a system for triggering event notifications based on messages sent to application users in accordance with some embodiments of the present disclosure.
Figure 1B:
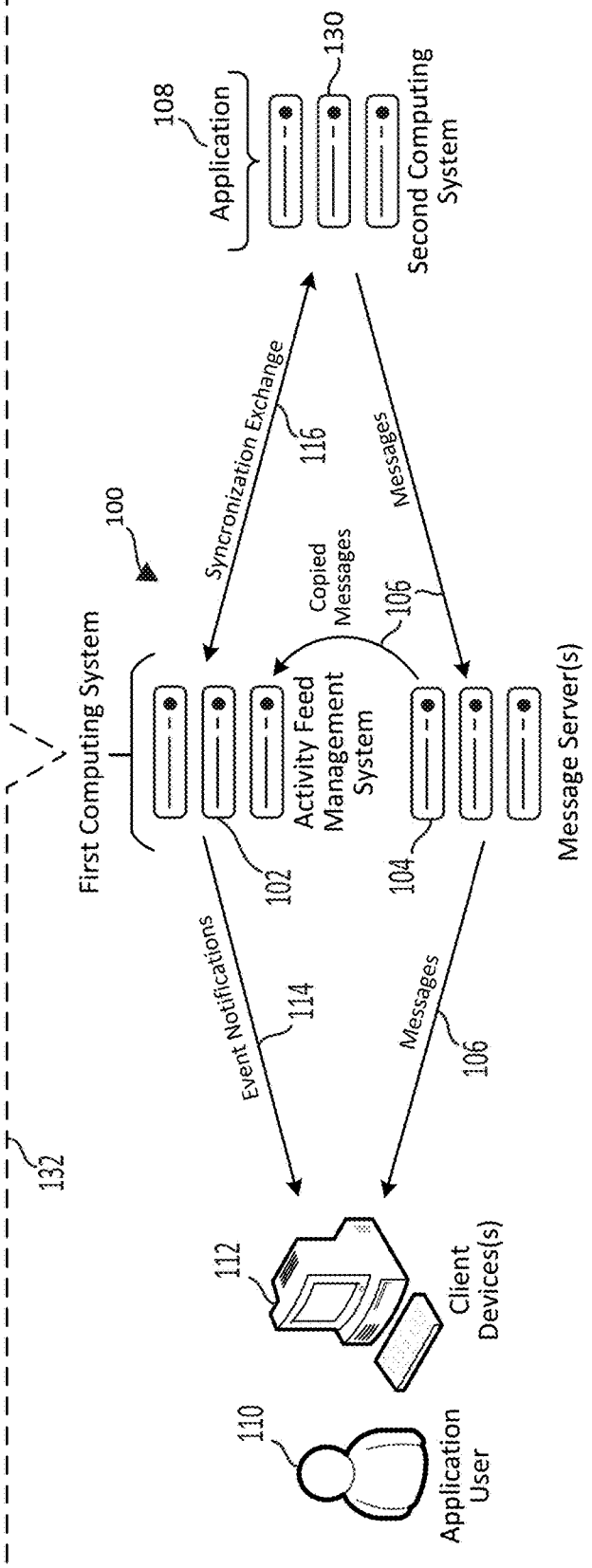

FIGS. 1A and 1B show example implementations of an activity feed management system 102 that may be configured to implement this novel approach in accordance with some embodiments. The hardware components shown in lower portions of FIGS. 1A and 1B, and the illustrated interactions between those components, are identical. The difference between FIGS. 1A and 1B relates to the example routines 118 and 132 (performed by a first computing system 100) that are shown in the upper portions of those figures. Each of those example routines 118, 132 is described separately below, following a description of the interactions amongst the illustrated hardware components.

As shown in FIGS. 1A and 1B, in some implementations, the first computing system 100 may include both the activity feed management system 102 and one or more message servers 104. In some implementations, the message server(s)

104 may include one or more email servers, such a Microsoft Exchange server. Further, as also shown in FIGS. 1A and 1B, a second computing system 130 may host an application 108, e.g., a SaaS application. The message server(s) 104 may be configured to identify messages 106, e.g., email messages, that the application 108 sends to an account, e.g., an email account, of a user 110 who is authorized to use the application 108. The user 110 may operate one or more client devices 112 to view and respond to event notifications 114 that are received from the activity feed management system 102 as well as to receive and view the messages 106 that are provided via the message server(s) 104. Further, although not specifically shown in FIGS. 1A and 1B, the user 110 may additionally operate the client device(s) 112 to interact with the application 108 (e.g., a SaaS application), e.g., via an internet connection (not shown). In some implementations, the activity feed management system 102 may be the resource management services 502 shown in FIG. 5C, and the event notifications 114 may be notifications 546 that those services provide to the user 524 of the client device 202, as described below.

As shown in FIGS. 1A and 1B, in some implementations, the message server(s) 104 may identify the messages 106 that the application 108 sends to an account of the user 110 and may send copies of those messages 106 to the activity feed management system 102 for processing. The message server(s) 104 may, for example, be provided with a plugin that can be configured to identify messages 106 that meet one or more particular criterion, e.g., messages in which a particular address is included in the "from" field. As noted above, in some implementations, the message server(s) 104 may be a Microsoft Exchange server. In such implementations, the plugin may be a transport agent that is installed and configured on such a server.

The activity feed management system 102 may, in response to receiving copies of the email messages 106 from the message server(s) 104, initiate synchronization exchanges 116 for particular user accounts the application 108 services. Based on data that the activity feed management system 102 receives from the application 108 during such synchronization exchanges, the activity feed management system 102 may generate and send event notifications 114 to the client device 112 for viewing and/or response by the user 110. As described in more detail below, in some implementations, an analysis engine included in the activity feed management system 102 and/or a plugin of the message server(s) 104 may evaluate the header fields and/or content of the messages 106 using various rules to determine whether those messages 106 relate to notification-worthy events.

FIG. 1A shows a first example routine 118 that may be performed the first computing system 100 in accordance with some embodiments. As shown, at a step 120 of the routine 118, the first computing system 100 may receive a message 106, e.g., an email message, from the application 108, e.g., a SaaS application, hosted on the second computing system 130. As the text of the step 120 indicates, the received message 106 may be indicative of an event of the application 108.

At a step 122 of the routine 118, in response to receiving the message 106, the first computing system 100 may generate a notification 114 indicative of the event of the application 108. Such a notification 106 may, for example, be a notification 546 that is created by the analytics service 536 shown in FIG. 5C (described in Section E below).

At a step 124 of the routine 118, the first computing system 100 may send the notification 114 generated at the step 122 to a client device 112. In some implementations, the notification 114 sent to the client device 112 may include one or more user interface elements that are selectable so as to cause the client device 112 to send a response to the notification 546 to the first computing system 100.

At a step 126 of the routine 118, the first computing system 100 may receive a response (not illustrated) to the notification 114, e.g., when the user 110 operates the client device 112 to select a user interface element in the notification 114.

At a step 128 of the routine 118, the first computing system 100 may process the received response to the notification 546 to cause the application 108 to take an action responsive to the event. For example, in some implementations, the microapp service 528 (see FIG. 5C) of the activity feed management system 102 may retrieve access credentials of the user 110 from the credential wallet service 532 (see FIG. 5C), and instruct the data integration provider service 530 (see FIG. 5C) to use such access credentials to perform the action with respect to the application 108, e.g., via an API command.

FIG. 1B shows a second example routine 132 that may be performed by the first computing system 100 in accordance with some embodiments. As shown, at a step 134 of the routine 132, the first computing system 100 may receive a message 106, e.g., an email message, from the application 108, e.g., a SaaS application, hosted on the second computing system 130. As the text of the step 134 indicates, the received message 106 may be indicative of an event of the application 108.

At a step 136 of the routine 132, in response to receiving the message 106, the first computing system may send a request to the application 108 for data relating to the event. Such a request may, for example, correspond to a request that the activity feed management system 102 sends to the application 108 in connection with a synchronization exchange 116 between those two components, as described above. For example, in some implementations, the microapp service 528 (see FIG. 5C) of the activity feed management system 102 may retrieve access credentials of the user 110 from the credential wallet service 532 (see FIG. 5C), and instruct the data integration provider service 530 (see FIG. 5C) to use such access credentials to request data corresponding to the event from the application 108, e.g., via an API command.

In some implementations, as FIG. 1B illustrates, the message server(s) 104, e.g., an email server, may send a copy of the received message 106, e.g., an email message, to the activity feed management system 102 for processing to determine whether the message 106 relates to a notification-worthy event. As explained in more detail below, in some implementations, the message server(s) 104 may include a plugin that is configured to evaluate incoming messages 106 to identify those that were received from the application 108 and forward such identified messages 106 to the activity feed management system 102 for further evaluation.

At a step 138 of the routine 132, the first computing system 100 may receive the requested data from the application 108. The data received at the step 138 may, for example, correspond to data the activity feed management system 102 receives from the application 108 in connection with a synchronization exchange 116 between those two components, as described above.

At a step 140 of the routine 132, the first computing system 100 may generate a notification 114 indicative of the event. As the text of the step 140 indicates, such a notification 114 may be generated based at least in part on the data the was received from the application 108 pursuant to the step 138. As noted above, in some implementations, the notification 114 generated at the step 140 may correspond to a notification 546 of a resource activity feed service, such that described below in connection with FIGS. 5C and 5D.

At a step 142 of the routine 132, the first computing system 100 may send the notification 114 generated at the step 140 to a client device 112. As noted previously, in some implementations, the notification 114 sent to the client device 112 may include one or more user interface elements that are selectable so as to cause the client device 112 to send a response to the notification 114 to the first computing system 100. In response to receiving such a response, the first computing system 100 may cause the application 108 to take an action responsive to the event. For example, in some implementations, the microapp service 528 (see FIG. 5C) of the activity feed management system 102 may retrieve access credentials of the user 110 from the credential wallet service 532 (see FIG. 5C), and instruct the data integration provider service 530 (see FIG. 5C) to use such access credentials to perform the action with respect to the application 108, e.g., via an API command.

Additional details and example implementations of embodiments of the present disclosure are set forth below in Section F, following a description of example systems and network environments in which such embodiments may be deployed.

B. Network Environment

Figure 2:
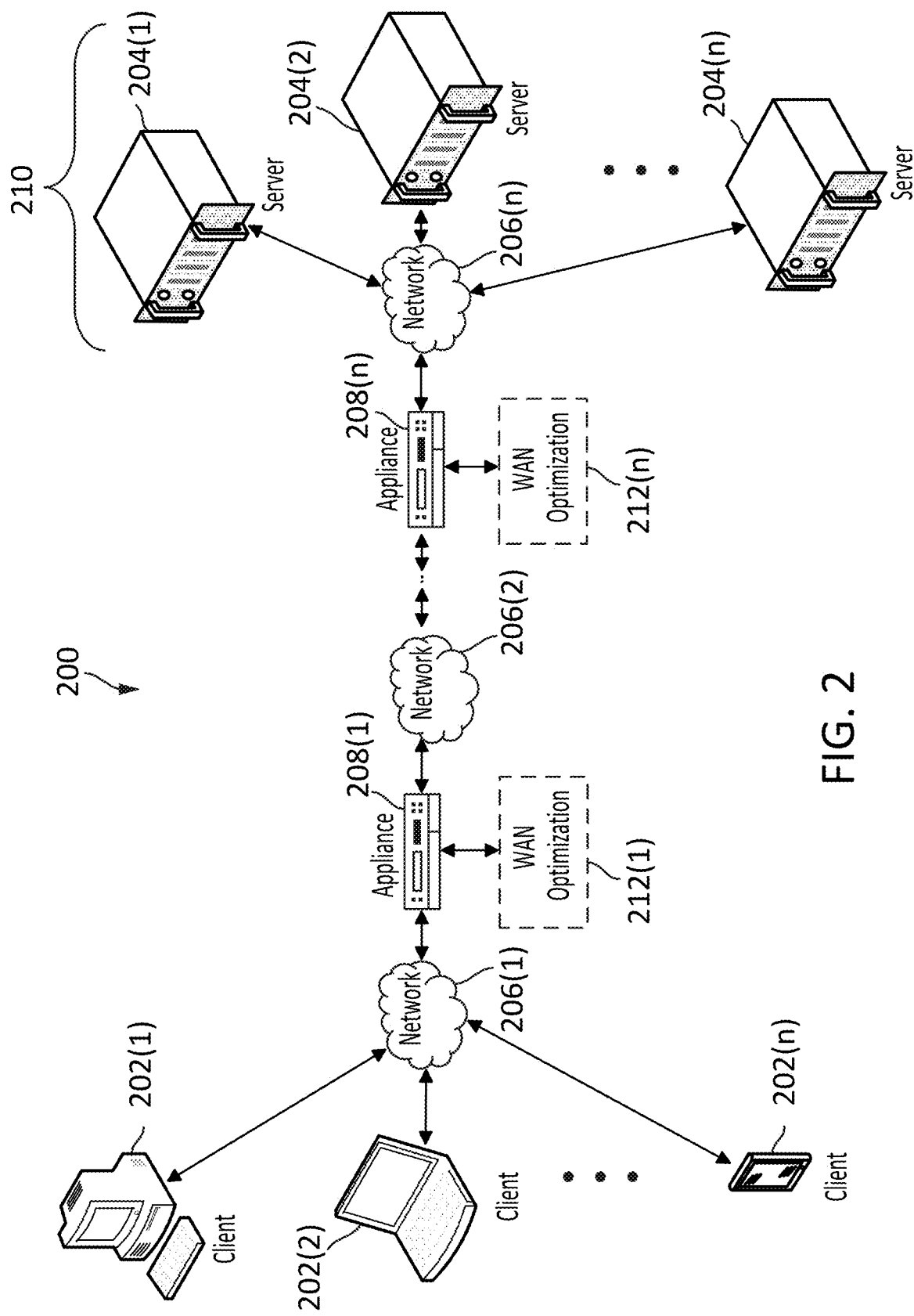
FIG. 2 is a diagram of a network environment in which some embodiments of the message exchange system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210.

The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
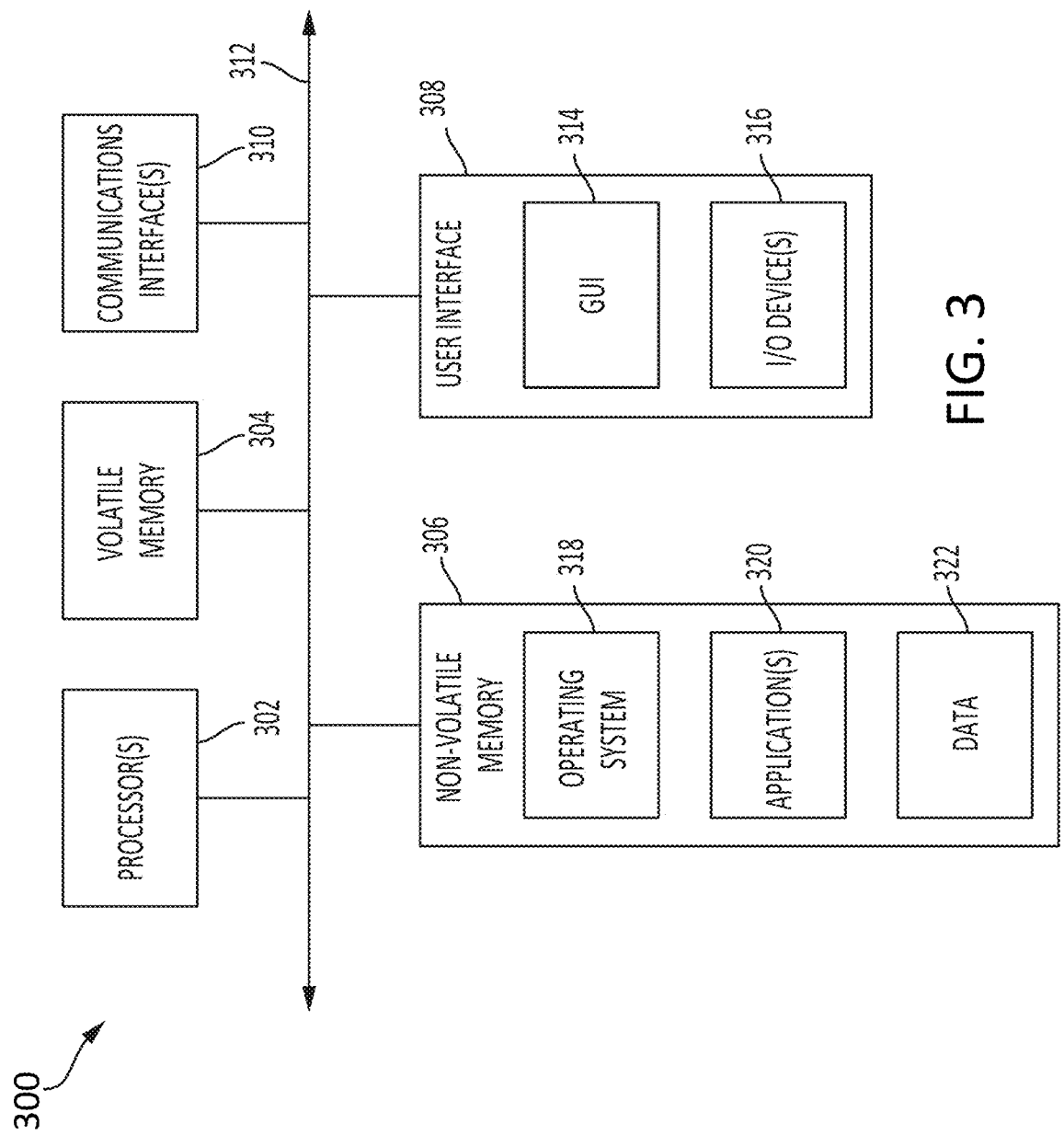
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
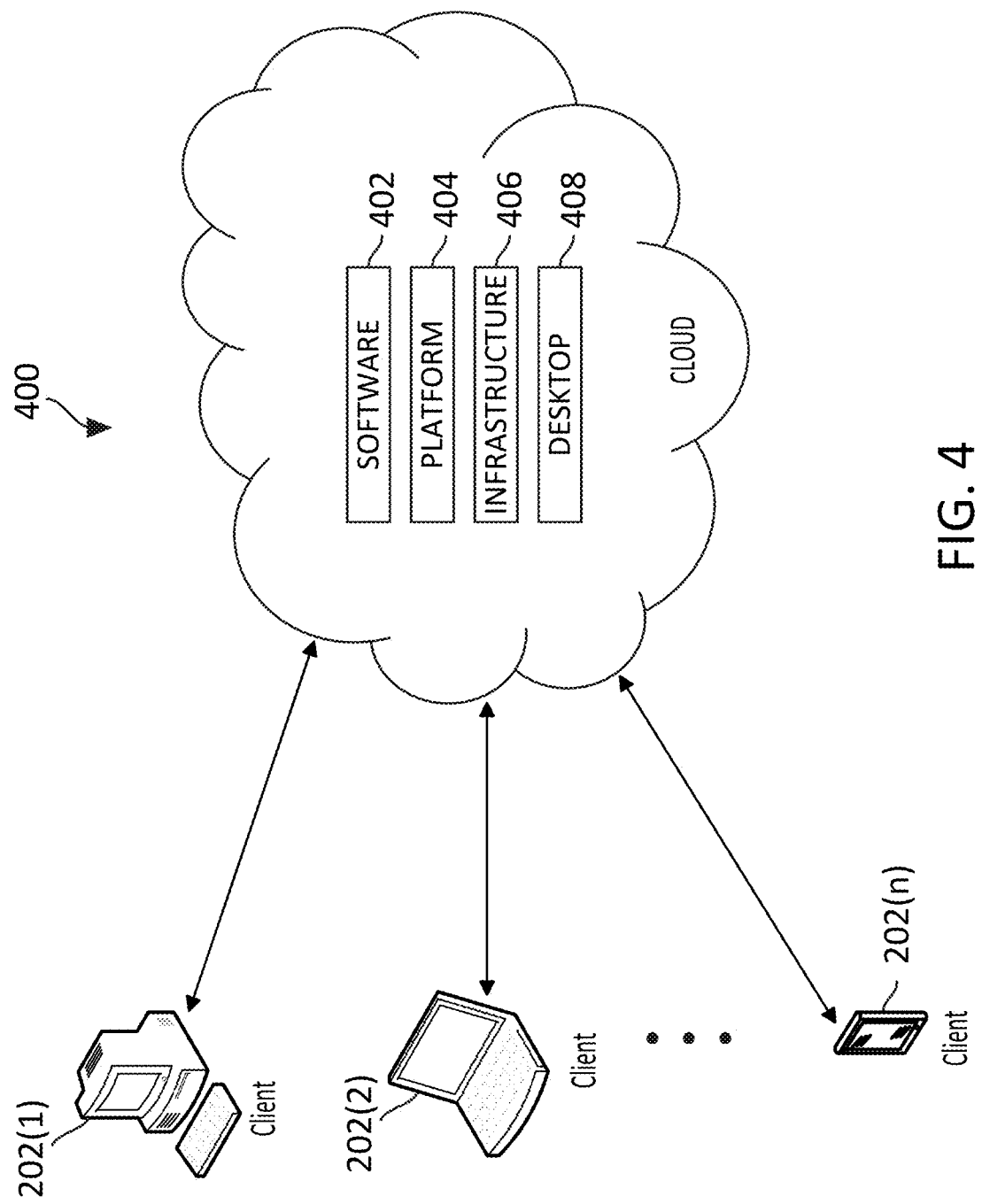
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one of more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., username and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically cause active data to be pulled from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system or record to which the notification 546 corresponds, thus helping the user understand the proper context with which to decide how best to respond to the notification 546. In some implementations, one of more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D) and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record.

In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user-interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user-interface element 552 or by selecting a desired action from a list 554 of recently and/or commonly used microapp actions. As shown, the user may also access files (e.g., via a Citrix ShareFile™ platform) by selecting a desired file, e.g., via a drop-down menu accessible using the "files" user interface element 556 or by selecting a desired file from a list 558 of recently and/or commonly used files.

Although not shown in FIG. 5D, it should be appreciated that, in some implementations, additional resources may also be accessed through the screen 540 by clicking on or otherwise selecting one or more other user interface elements that may be presented on the screen. For example, in some embodiments, one or more virtualized applications may be accessible (e.g., via a Citrix Virtual Apps and Desktops™ service) by clicking on or otherwise selecting an "apps" user-interface element (not shown) to reveal a list of accessible applications and/or one or more virtualized desktops may be accessed (e.g., via a Citrix Virtual Apps and Desktops™ service) by clicking on or otherwise selecting a "desktops" user-interface element (not shown) to reveal a list of accessible desktops.

The activity feed shown in FIG. 5D provides significant benefits, as it allows a user to respond to application-specific events generated by disparate systems of record without needing to navigate to, launch, and interface with multiple different native applications.

F. Detailed Description of Example Embodiments of Systems and Methods for Triggering Event Notifications Based on Messages Sent to Application Users Section A above introduced an example implementation of an activity feed management system 102 that may receive and process messages 106, e.g., email message, that an application 108, e.g., a SaaS application, sends to an account, e.g., an email account, of a user 110 of the application 108. Such an activity feed management system 102 may, for example, correspond to and/or operate in conjunction with the resource management services 502 described above in connection with FIGS. 5C and 5D. In some implementations, the message server(s) 104 shown in FIGS. 1A and 1B may be an email server, e.g., a Microsoft Exchange server, of the same organization the implements the activity feed management system 102. As noted in Section A, in some implementations, the message server(s) 104 may include a plugin, e.g., a transport agent for Microsoft Exchange, that is configured to identify messages 106 from the application 108, and forward copies of those messages 106 to the activity feed management system 102 for processing. Further, as was also noted in Section A, in some implementations, the activity feed management system 102 may include an analysis engine that analyzes the copied messages 106 the activity feed management system 102 receives from the message server(s) 104 to determine whether they relate to events of the application for which notifications 546 should be generated.

Figure 6:
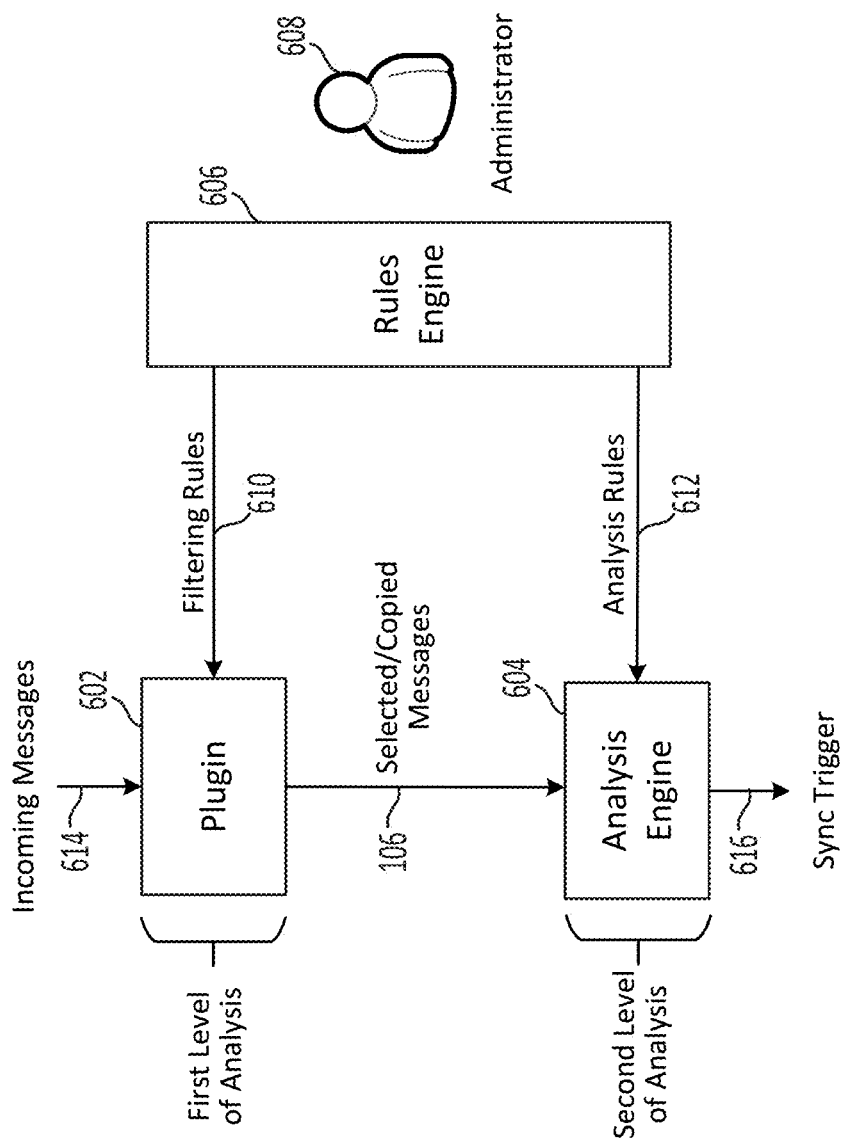
FIG. 6 is a functional block diagram showing example operations that may be performed by a plugin of the message server(s) and an analysis engine of the activity feed management system shown in FIGS. 1A and 1B.

FIG. 6 is a block diagram showing how, in some implementations, a plugin 602 (e.g., installed on the message server(s) 104) and an analysis engine 604 (e.g., included within the activity feed management system 102), may perform two levels of analysis on incoming messages 614, e.g., emails, that hit the message server(s) 104, e.g., an email server. In particular, as indicated, the plugin 602 may perform a first level of analysis during which a subset of the incoming messages 614 are selected for a further, second level of analysis by the analysis engine 604. Further, as shown in FIG. 6, a rules engine 606 may provide rules to the plugin 602 and the analysis engine 604, as specified by a system administrator 608. In particular, as indicated, the rules engine 606 may provide filtering rules 610 to the plugin 602 and may also provide analysis rules 612 to the analysis engine 604.

In some implementations, the filtering rules 610 may provide for a coarse level filtering of the incoming messages 614 being processed by the message server(s) 104 by, for example, selecting any messages that originate "from" an address associated with the application 108. As indicated, the messages selected for further processing by the plugin 602 may correspond to the copied messages 106 that the message server(s) 104 send to the activity feed management system 102, as shown in FIGS. 1A and 1B. In some implementations, the analysis rules 612 may provide for a more detailed analysis and filtering of the copied messages 106 to confirm that those messages 106 relate to notification-worthy events of the application. For example, in some implementations, the analysis rules 612 may cause the analysis engine 604 to examine text within the message's title and/or body for one or more words or phrases that are indicative of an event the application user 110 ought to be notified about by way of a notification 114, 546.

In some implementations, a system administrator 608 may evaluate messages 106 that application users 110 receive from various applications, either manually or using an automated process, to identify sets of messages 106 that are formatted similarly and/or that have similar content (e.g., similar words or phrases), and may further evaluate such message sets to identify those that relate to significant events of the applications. Based on that analysis, a system administrator 608 may modify the filtering rules 610 and/or the analysis rules 612 such that messages 106 having the common format and/or content consistently generate a sync trigger 616.

Although the example implementation shown in FIG. 6 includes two separate levels of analysis, i.e., one by the plugin 602 and another by the analysis engine 604, it should be appreciated that, in other implementations, the more-detailed analysis performed by the analysis engine 604 may instead be performed by the plugin 602. Separately performing the two analysis levels may be advantageous, however, particularly when there may be a risk of overburdening or exhausting the rule-processing capabilities of the plugin 602. That is, some plugins 602 may have limitations on the number and/or types of rules they can implement. Accordingly, performing the above analysis in multiple stages may allow the plugin 602 to perform only the more simple filtering tasks it was designed to do, and leave the more extensive and/or complex analysis to the analysis engine 604, which may not have the same limitations as the plugin 602.

In some implementations, the analysis engine 604 may be included within, or operate in conjunction with, the analytics service 536 and/or the microapp service 528 shown in FIG. 5C. In any event, no matter where the analysis engine 604 happens to be located, in response to the analysis engine 604 determining that a message 106 relates to a notification-worthy event for a user 110, 524, the analysis engine 604 may, in some implementations, cause the microapp service 528 to implement a process for generating a notification 114, 546 for the application user 110. For example, as shown in FIG. 6, in some implementations, the analysis engine 604 may generate a "sync trigger" 616 that causes a data sync to take place between the activity feed management system 102 and the application 108. In such implementations, data received from the application 108 as a result of such a data sync may then be used to generate a notification 114, 546.

Figure 7:
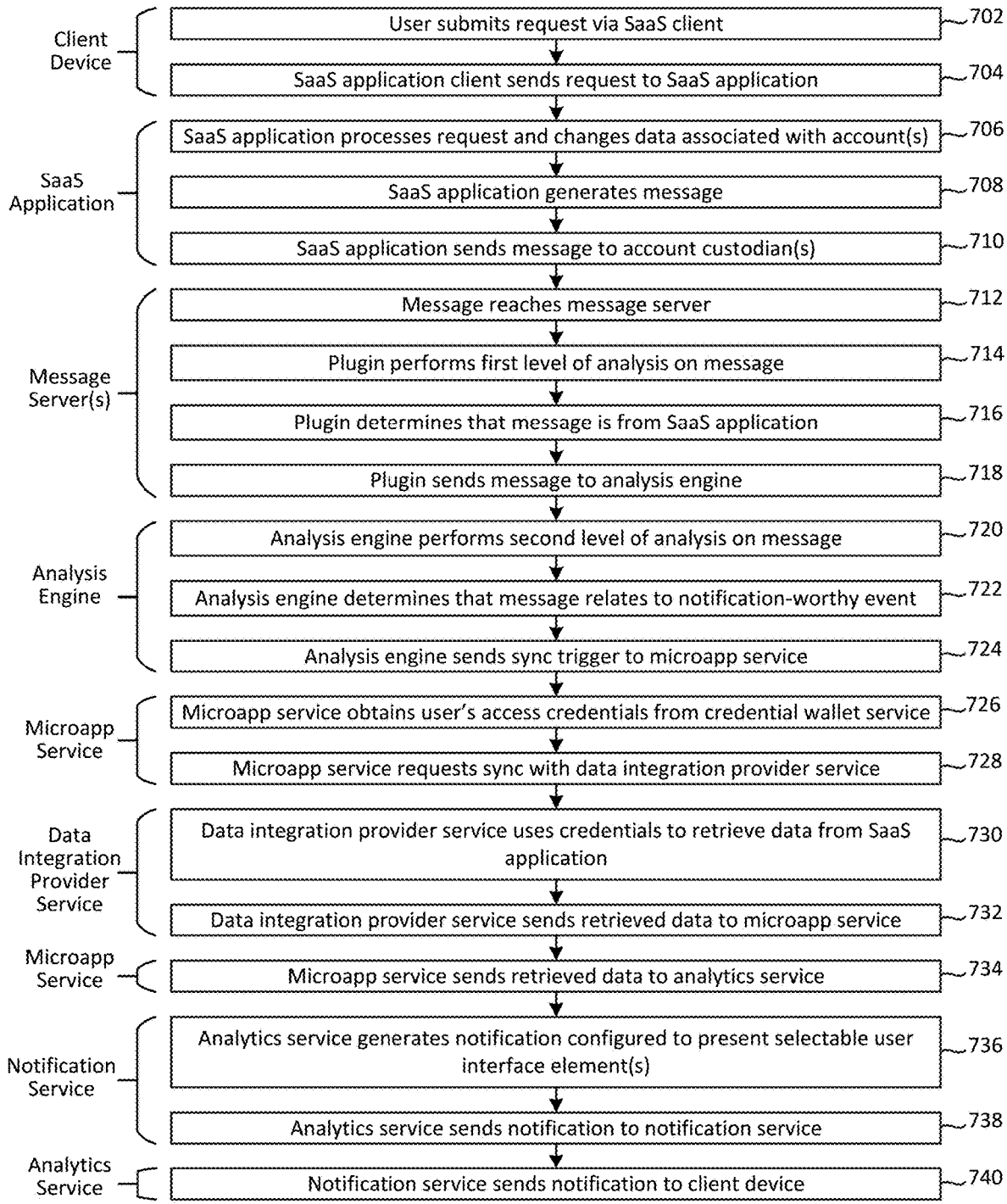
FIG. 7 is a flow chart showing example steps that may be performed by various components shown in FIGS. 1A, 1B, 5C, and 6 when the activity feed management system shown in FIGS. 1A and 1B is implemented using the resource management services shown in FIGS. 5B and 5C.

FIG. 7 is a flow chart showing example steps that may be performed by various components shown in FIGS. 1A, 1B, 5C, and 6 in an embodiment in which the activity feed management system 102 is implemented using the resource management services 502 shown in FIGS. 5B and 5C. The particular components that may perform the respective steps shown in FIG. 7 are indicated to the left of the steps. In the illustrated example, it is assumed that the application 108 shown in FIGS. 1A and 1B corresponds to one of the SaaS applications 508 shown in FIG. 5B. As such, the application 108 (i.e., a SaaS application 508) may also be assumed to correspond to one of the systems of record 526 shown in in FIG. 5C.

As shown in FIG. 7, at a step 702, a client device 112, 202 may receive a user input corresponding to a request to the SaaS application 108, 508, 526. At a step 704, the client device 112, 202 may send the request to the SaaS application 108, 508, 526 for processing. As indicated above in Section A, it should be appreciated that, although not illustrated in FIGS. 1A and 1B, the client device(s) 112 may communicate directly with the application 108 (e.g., a SaaS application) over a network connection, e.g., via an internet connection, so as to allow users 110 to interact with the application directly 108. The request the client device 112, 202 sends at the step 704 corresponds to such a usual use of the application 108 by the client device 112, 202, and does not involve the first computing system 100 shown FIGS. 1A and 1B.

At a step 706, the SaaS application 108, 508, 526 may process the request received from the client device 112, 202. Such processing may cause data corresponding to one or more accounts with the SaaS application 108, 508, 526 to change. The impacted account(s) may be associated with the user 110, 524 who submitted the request at the step 702 and/or may be associated with one or more other users 110, 524. Although, in the illustrated example, the data change(s) effected at the step 706 result from a request received from a client device 112, 202, it should be appreciated that, in other situations, such data changes may be instead by caused by other activity within the SaaS application 108, 508, 526 and/or by inputs received from other sources.

At a step 708, the SaaS application 108, 508, 526 may generate at least one message 106 (e.g., an email message) to inform a user 110, 524 about an event that occurred with respect to that user's account. For example, the SaaS application 108, 508, 526 may determine that, as a result of the data change(s) effected at the step 706 or otherwise, an input is to be sought from a particular user 110, 524. At a step 710, the SaaS application 108, 508, 526 may send the generated message 106 to an address of a custodian, e.g., an email address of the user 110, of the impacted SaaS account. As noted above, in some implementations, the message server(s) 104 shown in FIGS. 1A and 1B may be an email server, e.g., a Microsoft Exchange server, of the same organization the implements the activity feed management system 102. Accordingly, in such implementations, assuming the users 110, 524 registered with the SaaS application 108, 508, 526 using their organizational email addresses, the email messages sent from the SaaS application 108, 508, 526 to such users will reach the message server(s) 104 for processing.

At a step 712, the message 106 the SaaS application 108, 508, 526 sent to the custodian of the impacted account may reach the message server(s) 104. At a step 714, the plugin 602, e.g., an email plugin, may perform a first level of analysis of incoming messages 614 to the message server(s) 104, as described above in connection with FIG. 6, to determine whether any of those messages was sent by the SaaS application 108, 508, 526. Most of the incoming messages 106 may be determined not to have been sent by the SaaS application 108, 508, 526, and the message server(s) 104 may process those messages in an ordinary fashion, such as delivering them to their intended recipients.

At a step 716, the plugin 602 may determine that one of the incoming messages 614 was sent by the SaaS application 108, 508, 526. At a step 718, the plugin 602 may send a copy of that message 106 to the analysis engine 604 (see FIG. 6). The message server(s) 104 may additionally process the message 106 that was copied in an ordinary fashion, such as delivering them to their intended recipients. Alternatively, in some implementations, the messages 106 that are determined to have been sent from the SaaS application 108, 508, 526 may be intercepted rather than being delivered to the accounts to which they were addressed. For instance, in some implementations, the application 108, 508, 526 may send certain messages 106, e.g., email messages from a special domain, solely for the purpose of generating a sync trigger 616. In such a case, the message server(s) 104 may determine not to deliver those messages to user accounts.

At a step 720, the analysis engine 604 may perform a second level of analysis of the message 106 it received from the plugin 602, as described above in connection with FIG. 6, to determine whether the message 106 relates to a notification-worthy event, as discussed above. At a step 722, the analysis engine 604 may, based on the second level of analysis, determine that the message 106 relates to a notification-worthy event for the user 110, 524 to whom the message 106 was directed. For example, as noted above, in some implementations, the analysis engine 604 may evaluate the message 106 against the analysis rules 612 received from the rules engine 606 to determine whether text within the message's title and/or body includes one or more words or phrases are indicative of an event the application user 110, 524 ought to be notified about by way of a notification 114, 546. At a step 724, the analysis engine 604 (shown in FIG. 6) may send a sync trigger 616 to the microapp service 528 (shown in FIG. 5C).

At a step 726, the microapp service 528 may retrieve (e.g., from the credential wallet service 532 shown in FIG. 5C) encrypted access credentials for the SaaS account of the user 110, 524 to whom the message 106 was directed, as described above in connection with FIG. 5C. At a step 728, the microapp service 528 may instruct the data integration provider service 530 (shown in FIG. 5C) to perform a data sync with that user's SaaS application account, as described above in connection with FIG. 5C.

At a step 730, the data integration provider service 530 may decrypt the application user's account credentials and use those credentials to retrieve data from the SaaS application 108, 508, 526, e.g., via an API request, as described above in connection with FIG. 5C. At a step 732, the data integration provider service 530 may send the retrieved data to the microapp service 528, as described above in connection with FIG. 5C.

At a step 734, the microapp service 528 may send the data received from the data integration provider service 530 to the analytics service 536 (shown in FIG. 5C) for processing, as described above in connection with FIG. 5C.

At a step 736, the analytics service 536 may generate a notification 114, 546 for the user 110, 524 to whom the message 106 was directed, as described above in connection with FIG. 5C. As indicated, in some implementations, the notification 114, 546 may be configured to present one or more user interface elements 548, 550 (shown in FIG. 5D) that the user 110, 524 can select to cause a responsive action to be taken with respect to the SaaS application 108, 508, 526, as discussed above in connection with FIG. 5D. At a step 738, the analytics service 536 may send the generated notification to the notification service 538 (shown in FIG. 5C), as described above in connection with FIG. 5C.

At a step 740, the notification service 538 may send the generated notification 114, 546, either as an element of an activity feed 544 or as a separate push notification, to a client device 112, 202 operated by the user 110, 524 to whom the message 106 was directed, as described above in connection with FIG. 5C. The notification 114, 546 may then be presented via a display screen of the client device 112, 202, such as in the activity feed 544 shown in FIG. 5D.

G. Example Implementations of Methods, Systems, and Computer-Readable Media in Accordance with the Present Disclosure The following paragraphs (M1) through (M16) describe examples of methods that may be implemented in accordance with the present disclosure.

(M1) A method may be performed that may involve receiving, by a first computing system, a message from an application hosted on a second computing system, the message being indicative of an event of the application; generating, by the first computing system and in response to receiving the message, a notification indicative of the event; sending, by the first computing system, the notification to a client device; receiving, by the first computing system and from the client device, a response to the notification; and processing, by the first computing system, the received response to the notification to cause the application to take an action responsive to the event.

(M2) A method may be performed as described in paragraph (M1), wherein the message may comprise an email message.

(M3) A method may be performed as described in paragraph (M1) or (M2), and may further involve analyzing, by the first computing system, the email message to determine that the email message is indicative of the event; and wherein generating the notification may be based at least in part on the first computing system determining that the email message is indicative of the event.

(M4) A method may be performed as described in paragraph (M3), wherein analyzing the email message may further comprise determining, by an email server, that the email message was sent by the application.

(M5) A method may be performed as described in any of paragraphs (M1) through (M4), and may further involve configuring the notification to present at least one user interface element that is selectable to cause the response to be sent to the first computing system.

(M6) A method may be performed as described in any of paragraphs (M1) through (M5), and may further involve sending, by the first computing system and to the second computing system, an instruction to cause the application to take the action.

(M7) A method may be performed as described in any of paragraphs (M1) through (M6), and may further involve determining, by the first computing system and based at least in part on the message, that the event relates a user of the application; determining, by the first computing system, that the client device is being operated by the user; and determining, by the first computing system, to send the notification to the client device based at least in part on the event relating to the user and the client device being operated by the user.

(M8) A method may be performed as described in any of paragraphs (M1) through (M7), and may further involve sending, by the first computing system, a request to the application for data relating to the event; receiving, by the first computing system, the data relating to the event from the application; and determining, by the first computing system, to generate the notification based at least in part on the received data.

(M9) A method may be performed as described in any of paragraphs (M1) through (M8), wherein the application may comprise a software-as-a-service application.

(M10) A method may be performed that may involve receiving, by a first computing system, a message from an application hosted on a second computing system, the message being indicative of an event of the application; in response to receiving the message, sending, by the first computing system, a request to the application for data relating to the event; receiving, by the first computing system, the data relating to the event from the application; generating, by the first computing system and based at least in part on the received data, a notification indicative of the event; and sending, by the first computing system, the notification to a client device.

(M11) A method may be performed as described in paragraph (M10), wherein the message may comprise an email message.

(M12) A method may be performed as described in paragraph (M10) or (M11), and may further involve analyzing, by the first computing system, the email message to determine that the email message is indicative of the event; and wherein sending the request to the application may be based at least in part on the first computing system determining that the email message is indicative of the event.

(M13) A method may be performed as described in paragraph (M12), wherein analyzing the email message may further comprise determining, by an email server, that the email message was sent by the application.

(M14) A method may be performed as described in any of paragraphs (M10) through (M13), and may further involve configuring the notification to present at least one user interface element that is selectable to cause an instruction to take an action responsive to the event a response to be sent from the client device to the first computing system.

(M15) A method may be performed as described in any of paragraphs (M10) through (M14), and may further involve determining, by the first computing system and based at least in part on the message, that the event relates a user of the application; determining, by the first computing system, that the client device is being operated by the user; and determining, by the first computing system, to send the notification to the client device based at least in part on the event relating to the user and the client device being operated by the user.

(M16) A method may be performed as described in any of paragraphs (M10) through (M15), wherein the application may comprise a software-as-a-service application.

The following paragraphs (S1) through (S16) describe examples of systems and devices that may be implemented in accordance with the present disclosure.

(S1) A first computing system may include at least one processor and at least one computer-readable medium encoded with instructions which, when executed by the at least one processor, may cause the first computing system to receive a message from an application hosted on a second computing system, the message being indicative of an event of the application; to generate, in response to receiving the message, a notification indicative of the event; to send the notification to a client device; to receive, from the client device, a response to the notification; and to process the received response to the notification to cause the application to take an action responsive to the event.

(S2) A first computing system may be configured as described in paragraph (S1), wherein the message may comprise an email message.

(S3) A first computing system may be configured as described in paragraph (S1) or (S2), and the at least one computer-readable medium may be encoded with additional instructions which, when executed by the at least one processor, further cause the first computing system to analyze the email message to determine that the email message is indicative of the event; and to generate the notification based at least in part on the first computing system determining that the email message is indicative of the event.

(S4) A first computing system may be configured as described in paragraph (S3), and the at least one computer-readable medium may be encoded with additional instructions which, when executed by the at least one processor, further cause the first computing system to analyze the email message at least in part by determining, by an email server, that the email message was sent by the application.

(S5) A first computing system may be configured as described in any of paragraphs (S1) through (S4), and the at least one computer-readable medium may be encoded with additional instructions which, when executed by the at least one processor, further cause the first computing system to configure the notification to present at least one user interface element that is selectable to cause the response to be sent to the first computing system.

(S6) A first computing system may be configured as described in any of paragraphs (S1) through (S5), and the at least one computer-readable medium may be encoded with additional instructions which, when executed by the at least one processor, further cause the first computing system to send, to the second computing system, an instruction to cause the application to take the action.

(S7) A first computing system may be configured as described in any of paragraphs (S1) through (S6), and the at least one computer-readable medium may be encoded with additional instructions which, when executed by the at least one processor, further cause the first computing system to determine, based at least in part on the message, that the event relates a user of the application; to determine that the client device is being operated by the user; and to determine to send the notification to the client device based at least in part on the event relating to the user and the client device being operated by the user.

(S8) A first computing system may be configured as described in any of paragraphs (S1) through (S7), and the at least one computer-readable medium may be encoded with additional instructions which, when executed by the at least one processor, further cause the first computing system to send a request to the application for data relating to the event; to receive the data relating to the event from the application; and to determine to generate the notification based at least in part on the received data.

(S9) A first computing system may be configured as described in any of paragraphs (S1) through (S8), wherein the application may comprise a software-as-a-service application.

(S10) A first computing system may include at least one processor and at least one computer-readable medium encoded with instructions which, when executed by the at least one processor, may cause the first computing system to receive a message from an application hosted on a second computing system, the message being indicative of an event of the application; in response to receiving the message, to send a request to the application for data relating to the event; to receive the data relating to the event from the application; to generate, based at least in part on the received data, a notification indicative of the event; and to send the notification to a client device.

(511) A first computing system may be configured as described in paragraph (S10), wherein the message may comprise an email message.

(S12) A first computing system may be configured as described in paragraph (S10) or (S11), and the at least one computer-readable medium may be encoded with additional instructions which, when executed by the at least one processor, further cause the first computing system to analyze the email message to determine that the email message is indicative of the event; and to send the request to the application based at least in part on the first computing system determining that the email message is indicative of the event.

(S13) A first computing system may be configured as described in paragraph (S12), and the at least one computer-readable medium may be encoded with additional instructions which, when executed by the at least one processor, further cause the first computing system to analyze the email message at least in part by determining, by an email server, that the email message was sent by the application.

(S14) A first computing system may be configured as described in any of paragraphs (S10) through (S13), and the at least one computer-readable medium may be encoded with additional instructions which, when executed by the at least one processor, further cause the first computing system to configure the notification to present at least one user interface element that is selectable to cause an instruction to take an action responsive to the event a response to be sent from the client device to the first computing system.

(S15) A first computing system may be configured as described in any of paragraphs (S10) through (S14), and the at least one computer-readable medium may be encoded with additional instructions which, when executed by the at least one processor, further cause the first computing system to determine, based at least in part on the message, that the event relates a user of the application; to determine that the client device is being operated by the user; and to determine to send the notification to the client device based at least in part on the event relating to the user and the client device being operated by the user.

(S16) A first computing system may be configured as described in any of paragraphs (S10) through (S15), wherein the application may comprise a software-as-a-service application.

The following paragraphs (CRM1) through (CRM16) describe examples of computer-readable media that may be implemented in accordance with the present disclosure.

(CRM1) At least one computer-readable medium may be encoded with instructions which, when executed by at least one processor included in a first computing system, may cause the first computing system to receive a message from an application hosted on a second computing system, the message being indicative of an event of the application; to generate, in response to receiving the message, a notification indicative of the event; to send the notification to a client device; to receive, from the client device, a response to the notification; and to process the received response to the notification to cause the application to take an action responsive to the event.

(CRM2) At least one computer-readable medium may be configured as described in paragraph (CRM1), wherein the message may comprise an email message.

(CRM3) At least one computer-readable medium may be configured as described in paragraph (CRM1) or (CRM2), and may be encoded with additional instructions which, when executed by the at least one processor, further cause the first computing system to analyze the email message to determine that the email message is indicative of the event; and to generate the notification based at least in part on the first computing system determining that the email message is indicative of the event.

(CRM4) At least one computer-readable medium may be configured as described in paragraph (CRM3), and may be encoded with additional instructions which, when executed by the at least one processor, further cause the first computing system to analyze the email message at least in part by determining, by an email server, that the email message was sent by the application.

(CRM5) At least one computer-readable medium may be configured as described in any of paragraphs (CRM1) through (CRM4), and may be encoded with additional instructions which, when executed by the at least one processor, further cause the first computing system to configure the notification to present at least one user interface element that is selectable to cause the response to be sent to the first computing system.

(CRM6) At least one computer-readable medium may be configured as described in any of paragraphs (CRM1) through (CRM5), and may be encoded with additional instructions which, when executed by the at least one processor, further cause the first computing system to send, to the second computing system, an instruction to cause the application to take the action.

(CRM7) At least one computer-readable medium may be configured as described in any of paragraphs (CRM1) through (CRM6), and may be encoded with additional instructions which, when executed by the at least one processor, further cause the first computing system to determine, based at least in part on the message, that the event relates a user of the application; to determine that the client device is being operated by the user; and to determine to send the notification to the client device based at least in part on the event relating to the user and the client device being operated by the user.

(CRM8) At least one computer-readable medium may be configured as described in any of paragraphs (CRM1) through (CRM7), and may be encoded with additional instructions which, when executed by the at least one processor, further cause the first computing system to send a request to the application for data relating to the event; to receive the data relating to the event from the application; and to determine to generate the notification based at least in part on the received data.

(CRM9) At least one computer-readable medium may be configured as described in any of paragraphs (CRM1) through (CRM8), wherein the application may comprise a software-as-a-service application.

(CRM10) At least one computer-readable medium may be encoded with instructions which, when executed by at least one processor included in a first computing system may cause the first computing system to receive a message from an application hosted on a second computing system, the message being indicative of an event of the application; in response to receiving the message, to send a request to the application for data relating to the event; to receive the data relating to the event from the application; to generate, based at least in part on the received data, a notification indicative of the event; and to send the notification to a client device.

(CRM11) At least one computer-readable medium may be configured as described in paragraph (CRM10), wherein the message may comprise an email message.

(CRM12) At least one computer-readable medium may be configured as described in paragraph (CRM10) or (CRM11), and may be encoded with additional instructions which, when executed by the at least one processor, further cause the first computing system to analyze the email message to determine that the email message is indicative of the event; and to send the request to the application based at least in part on the first computing system determining that the email message is indicative of the event.

(CRM13) At least one computer-readable medium may be configured as described in paragraph (CRM12), and may be encoded with additional instructions which, when executed by the at least one processor, further cause the first computing system to analyze the email message at least in part by determining, by an email server, that the email message was sent by the application.

(CRM14) At least one computer-readable medium may be configured as described in any of paragraphs (CRM10) through (CRM13), and may be encoded with additional instructions which, when executed by the at least one processor, further cause the first computing system to configure the notification to present at least one user interface element that is selectable to cause an instruction to take an action responsive to the event a response to be sent from the client device to the first computing system.

(CRM15) At least one computer-readable medium may be configured as described in any of paragraphs (CRM10) through (CRM14), and may be encoded with additional instructions which, when executed by the at least one processor, further cause the first computing system to determine, based at least in part on the message, that the event relates a user of the application; to determine that the client device is being operated by the user; and to determine to send the notification to the client device based at least in part on the event relating to the user and the client device being operated by the user.

(CRM16) At least one computer-readable medium may be configured as described in any of paragraphs (CRM10) through (CRM15), wherein the application may comprise a software-as-a-service application.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
receiving, by a first computing system, an email message from an application hosted on a second computing system, the email message being indicative of an event of the application and addressed to an email account of a user of the application;
generating, by the first computing system and in response to receiving the email message, a notification indicative of the event;
sending, by the first computing system, the notification to a client device operated by the user;
receiving, by the first computing system and from the client device, a response to the notification; and
processing, by the first computing system, the received response to the notification to cause the application to take an action responsive to the event.

2. The method of claim 1, further comprising:
analyzing, by the first computing system, the email message to determine that the email message is indicative of the event;
wherein generating the notification is based at least in part on the first computing system determining that the email message is indicative of the event.

3. The method of claim 2, wherein:
analyzing the email message further comprises determining, by an email server, that the email message was sent by the application.

4. The method of claim 1, further comprising:
configuring the notification to present at least one user interface element that is selectable to cause the response to be sent to the first computing system.

5. The method of claim 1, further comprising:
sending, by the first computing system and to the second computing system, an instruction to cause the application to take the action.

6. The method of claim 1, further comprising:
determining, by the first computing system and based at least in part on the email message, that the event relates the user;
determining, by the first computing system, that the client device is being operated by the user; and
determining, by the first computing system, to send the notification to the client device based at least in part on the event relating to the user and the client device being operated by the user.

7. The method of claim 1, further comprising:
in response to receiving the email message, sending, by the first computing system, a request to the application for data relating to the event;
receiving, by the first computing system, the data relating to the event from the application; and
determining, by the first computing system, to generate the notification based at least in part on the received data.

8. The method of claim 1, wherein the application comprises a software-as-a-service application.

9. A method, comprising:
receiving, by a first computing system, an email message from an application hosted on a second computing system, the email message being indicative of an event of the application and addressed to an email account of a user of the application;
in response to receiving the email message, sending, by the first computing system, a request to the application for data relating to the event;
receiving, by the first computing system, the data relating to the event from the application;
generating, by the first computing system and based at least in part on the received data, a notification indicative of the event; and
sending, by the first computing system, the notification to a client device operated by the user.

10. The method of claim 9, further comprising:
analyzing, by the first computing system, the email message to determine that the email message is indicative of the event;
wherein sending the request to the application is based at least in part on the first computing system determining that the email message is indicative of the event.

11. The method of claim 10, wherein:
analyzing the email message further comprises determining, by an email server, that the email message was sent by the application.

12. The method of claim 9, further comprising:
configuring the notification to present at least one user interface element that is selectable to cause an instruction to take an action responsive to the event to be sent from the client device to the first computing system.

13. The method of claim 9, further comprising:
determining, by the first computing system and based at least in part on the email message, that the event relates the user;
determining, by the first computing system, that the client device is being operated by the user; and
determining, by the first computing system, to send the notification to the client device based at least in part on the event relating to the user and the client device being operated by the user.

14. The method of claim 9, wherein the application comprises a software-as-a-service application.

15. A first computing system, comprising:
at least one processor; and
at least one computer-readable medium encoded with instructions which, when executed by the at least one processor, cause the first computing system to:
receive an email message from an application hosted on a second computing system, the email message being indicative of an event of the application and addressed to an email account of a user of the application,
generate, in response to receiving the email message, a notification indicative of the event,
send the notification to a client device operated by the user,
receive, from the client device, a response to the notification, and
process the received response to the notification to cause the application to take an action responsive to the event.

16. The first computing system of claim 15, wherein the at least one computer-readable medium is further encoded with additional instructions which, when executed by the at least one processor, further cause the first computing system to:
analyze the email message to determine that the email message is indicative of the event; and
generate the notification based at least in part on the first computing system determining that the email message is indicative of the event.

17. The first computing system of claim 16, further comprising:
an email server configured to determine that the email message was sent by the application;
wherein the at least one computer-readable medium is further encoded with additional instructions which, when executed by the at least one processor, further cause an analysis engine of the first computing system to analyze the email message based at least in part on the email server determining that the email message was sent by the application.

18. The first computing system of claim 15, wherein the at least one computer-readable medium is further encoded with additional instructions which, when executed by the at least one processor, further cause the first computing system to:
in response to receiving the email message, send a request to the application for data relating to the event;
receive the data relating to the event from the application; and
determine to generate the notification based at least in part on the received data.

19. The first computing system of claim 15, wherein the at least one computer-readable medium is further encoded with additional instructions which, when executed by the at least one processor, further cause the first computing system to:
configure the notification to present at least one user interface element that is selectable to cause the response to be sent to the first computing system.

20. The first computing system of claim 15, wherein the at least one computer-readable medium is further encoded with additional instructions which, when executed by the at least one processor, further cause the first computing system to:

send, to the second computing system, an instruction to cause the application to take the action.

\* \* \* \* \*